(12) United States Patent
Unhoch

(10) Patent No.: US 7,094,353 B2
(45) Date of Patent: Aug. 22, 2006

(54) METHOD OF WATER TREATMENT

(75) Inventor: Michael J Unhoch, Wilmington, DE (US)

(73) Assignee: Arch Chemicals, Inc., Norwalk, CT (US)

( * ) Notice: Subject to any disclaimer, the term of this patent is extended or adjusted under 35 U.S.C. 154(b) by 0 days.

(21) Appl. No.: 10/691,479

(22) Filed: Oct. 22, 2003

(65) Prior Publication Data

US 2004/0129644 A1    Jul. 8, 2004

Related U.S. Application Data

(60) Provisional application No. 60/423,790, filed on Nov. 4, 2002.

(51) Int. Cl.
*C02F 1/50* (2006.01)
*C02F 1/76* (2006.01)

(52) U.S. Cl. .................. 210/749; 210/755; 210/759

(58) Field of Classification Search ................ 210/749, 210/753, 754, 755, 759, 764, 169, 416.2
See application file for complete search history.

(56) References Cited

U.S. PATENT DOCUMENTS

| | | | |
|---|---|---|---|
| 3,756,456 A | 9/1973 | Georgi | |
| 4,016,079 A | 4/1977 | Severin | |
| 4,224,154 A | 9/1980 | Steininger | |
| 4,550,011 A * | 10/1985 | McCollum | ............... 422/82.03 |
| 4,846,979 A | 7/1989 | Hamilton | |
| 5,056,036 A | 10/1991 | Van Bork | |
| 5,326,481 A * | 7/1994 | Alwerud | ..................... 210/742 |
| 5,422,014 A * | 6/1995 | Allen et al. | ................. 210/743 |
| 5,616,239 A * | 4/1997 | Wendell et al. | ................ 210/86 |
| 5,895,565 A | 4/1999 | Steininger et al. | |
| 6,003,164 A * | 12/1999 | Leaders | ........................ 4/507 |
| 6,149,821 A | 11/2000 | Rounds et al. | |

FOREIGN PATENT DOCUMENTS

EP    0867202    9/1998

* cited by examiner

*Primary Examiner*—Frank M. Lawrence
(74) *Attorney, Agent, or Firm*—Todd E. Garabedian; Wiggin and Dana LLP

(57) ABSTRACT

The invention relates to a method of treatment of bodies of water such as recreational pools, spas and hot tubs with maintenance doses of water treatment chemicals to achieve consistent sanitization and aesthetically pleasing levels of properties such as turbidity. The amount of the maintenance doses is based on the volume of water to be treated in order to achieve hygienic and clear water. The method can be automated for accurate, consistent and safe treatment of water such as found in swimming pools, spas or hot tubs.

10 Claims, No Drawings

METHOD OF WATER TREATMENT

This application claims priority to U.S. provisional application 60/423,790, filed Nov. 4, 2002.

FIELD OF THE INVENTION

The invention relates to methods for sanitation and clarification of water

BACKGROUND OF THE INVENTION

Recreational pools such as swimming pools, spas and hot tubs provide a great deal of pleasure and comfort. The extent of comfort depends on the quality of the water. In order to assure comfort and safety to users of these pools, it is important that the water be treated properly so that it is aesthetically pleasing in terms of taste, color, turbidity and odor. Proper treatment also is important so that the water has proper pH, and is environmentally safe as well as effectively free of pathogens and chemicals which may cause illness.

Conventional methods of treatment of water in recreational pools utilize water treatment chemicals such as oxidizers, sanitizers, algicides and pH buffers. Typically, the chemicals are measured and manually added to the water as part of an overall water maintenance program. In such a program, various water quality parameters are measured at regular intervals. When a parameter is not acceptable, an appropriate amount of water treatment chemical is measured and manually added to the water. In so doing, the user is undesirably exposed to the concentrated chemical.

Mixtures of chemicals also have been added to recreational pool water. Addition of mixtures of chemicals to promote water clarity is shown in U.S. Pat. No. 5,501,802. This patent discloses a mixture that includes polyhexamethylene biguanide sanitizer, persulfate salt oxidizers and chelating agents. U.S. Pat. Nos. 5,514,287 and 5,478,482 disclose a composition and a method for controlling microbial growth in recirculating water systems. The composition includes a soluble boron contributor, a halogen/boron sanitizer/algicide, and an oxidizing clarifier which includes a chlorine compound, a non-halogen oxidizer, and a boron source.

U.S. Pat. No. 4,846,979 discloses an algicide composition for treating swimming pools and spas. The algicide composition includes an alkali metal, alkaline earth metal or ammonium bromide and an oxidizer.

A popular sanitizer for water treatment is based on the polymeric biguanide described in U.S. Pat. No. 4,014,676. Use of polymeric guanides such as BAQUACIL® Sanitizer and Algistat sold by Avecia Inc. is popular because they do not cause eye irritation that is common with use of chlorine.

Water treated with BAQUACIL® Sanitizer and Algistat also can be treated with a separate algicide to combat algae. Oxidizers such as those which include hydrogen peroxide as the active component also may be added to the treated water to oxidize organic compounds in the water to promote clarity. An example of such an oxidizer is BAQUACIL® Shock and Oxidizer (from Avecia Inc.). BAQUACIL® Shock and Oxidizer is an aqueous solution that includes 27.5% hydrogen peroxide.

Consumers typically treat water found in pools, spas and hot tubs with chemicals such as sanitizers, oxidizers and algicides. Due to complexities such as the differing times specified for dosing various water treatment chemicals, difficulties in accurately measuring dosages, exposure to chemicals as well as cost of chemicals, consumers tend to avoid treating the water until problems such as haze and algae build-up occur.

A need therefore exists for a method that avoids these complexities and enables ready treatment of water such as that found in recreational pools.

SUMMARY OF THE INVENTION

The invention achieves controlled, continuous introduction of sanitizing and clarifying chemicals into water to maintain a desired residual level of those chemicals. The method may be employed in an automated dosing system.

In a first aspect, the invention relates to a method of treatment of bodies of water such as recreational pools, spas and hot tubs with maintenance doses of water treatment chemicals to achieve consistent sanitization and aesthetically pleasing levels of properties such as turbidity. The amount of the maintenance dose is based on the volume of water to be treated in order to achieve hygienic and clear water. More particularly, in this aspect a volume of water is treated to maintain a predetermined amount of a water treatment chemical. The method entails determining an amount of a water treatment chemical to be preserved in a volume of water to be treated. A maintenance dose of the chemical is added to the volume of water to maintain about the amount of the chemical in the water over a desired time period. The maintenance dose is determined from $MD=(PV)(DC)$ where MD=Maintenance dose of water treatment chemical, PV=Volume of water to be treated, and DC=Consumption amount of water treatment chemical over that desired time period. The maintenance dose may be supplied by a pump that has a pump tube displacement and which operates for a run time RT as determined by $RT = ((K)(MD)/(PRPM \times PTD))$ where:

RT=Run time of pump (sec)
PRPM=Pump speed (RPM)
PTD=Pump tube displacement (ml)/pump revolution
K=1776 ((sec-ml)/(min-oz)), and
MD is defined as above.

In another aspect, the invention relates to a system for treating a volume of water to maintain a predetermined amount of a water treatment chemical in the volume of water. The system includes a device for delivering a water treatment chemical to a volume of water where the device preferably is controlled by a computer. The device is caused to operate for a time sufficient to deliver a maintenance dose of water treatment chemical sufficient to maintain the predetermined amount of water treatment chemical in the volume of water over a desired time period. The maintenance dose $(MD)=(PV)(DC)$ where MD=maintenance dose of water treatment chemical, PV=Volume of water to be treated, and DC=Consumption amount of water treatment chemical over that desired time period.

The method of the invention achieves significant advantages. The method enables maintenance of a desired residual amount of a water treatment chemical such as a sanitizer, oxidizer or algicide in the water to control bacteria and nuisance algae and to achieve consistently low levels of turbidity. The maintenance dose may be added without the need for first measuring the amount of a water treatment chemical in the water prior to adding the maintenance dose of water treatment chemical as with manual additions of the chemical.

The method achieves water clarification in conjunction with an existing overall water maintenance program without adversely affecting other water quality parameters. The invention advantageously achieves improved water clarity and reduced amounts of algae on a consistent basis.

The method may be automated to minimize consumer exposure to chemicals, and to avoid errors of measurement that produce incorrect dosing of chemicals. Existing technology such as existing automatic dosing technology requires the customer to first calculate the dose of chemicals appropriate for effective treatment of their pool, spas and the like. Maintenance dosing as in the invention avoids the inaccuracies of under/overdosing associated with manual additions of water treatment chemicals. Automated maintenance dosing by a device such as a programmable pump, as in, for example, the BAQUACIL AD™ Automated Dosing System from Avecia, Inc., provides an accurate, consistent and safe method of dosing water treatment chemicals.

Although the method may be used to treat pools, spas, hot tubs and the like, it is particularly suitable for treating recreational pools. The invention, in addition to treatment of recreational water such as swimming pools and hot tubs, may be used in a variety of other water treatment applications. Examples of these applications include home water treatment, community water treatment, industrial water treatment, agriculture, water reuse and groundwater injection.

DETAILED DESCRIPTION OF THE INVENTION

Water treatment chemicals which may be used in the method include but are not limited to sanitizers, oxidizers and algicides. Sanitizers which may be employed include but are not limited to oxidizing biocides and non-oxidizing biocides.

Oxidizing biocides which may be used include but are not limited to chlorine dioxide, alkali metal hypochlorite such as lithium hypochlorite and sodium hypochlorite, alkaline earth metal hypochlorites such as calcium hypochlorite, chlorinated isocyanurates, sodium dichloro-s-triazinetrione, trichloro-s-triazinetrione and potassium dichloro-s-triazine trione, and halogenated hydantoins such as 1,3-bromo-chloro-dimethylhydantoin, and 1,3-dibromodimethylhydantoin.

Non-oxidizing biocides which may be used include but are not limited to (poly(hexamethylene biguanide) hydrochloride) such as BAQUACIL® from Avecia, preferably (poly(hexamethylene biguanide) hydrochloride.

Oxidizers which may be employed include but are not limited to peroxides such as hydrogen peroxide, potassium monopersulfate, chlorine dioxide, alkali metal perborates such as peroxide release agents as illustrated by sodium perborate, sodium persulfate, potassium monopersulfate and sodium percarbonates. Preferably, the oxidizer is hydrogen peroxide.

Algicides which may be employed include but are not limited to copper salts such as copper sulphate, copper citrate, copper EDTA (ethylene diaminetetraacetic acid), and copper gluconate, copper TEA (triethanolamine), colloidal silver, silver salts such as silver nitrate, quaternary or polyquaternary ammonium compounds such as poly(oxyethylene (dimethylimino) ethylene (dimethylimino) ethylene dichloride) available from Buckman Corp. under the trademame WSP, sodium dimethyldithiocarbamate, 2-chloro-4,6-bis(ethylamino)-5-triazine, zinc salts such as zinc chloride and zinc oxide, benzyl alkonium chloride available from Lonza Corp. Preferably, the algicide is benzyl alkonium chloride.

Other chemicals which may be employed in the method include, for example, chelating agents such as ethylene diaminetetra acetic acid and triethanolamine, fungicides, pH control agents (acids and bases), corrosion inhibitors, and stabilizers.

An initial, predetermined amount of a water treatment chemical such as sanitizer, oxidizer, and algicide is added to the water. This initial amount typically is sufficient to inactivate biological contaminants in the volume of water undergoing treatment. Each of the sanitizer, oxidizer and algicide may be provided in the form of liquid, powder or gas. Where an aqueous solution of the water treatment chemical is employed, the aqueous solution has about 1% to about 80% (active) water treatment chemical. Accordingly, where a sanitizer is employed, the aqueous solution has about 1 wt. % to about 80 wt. % (active) sanitizer. Similarly, where an oxidizer is employed, the aqueous solution has about 0.5 wt. % to about 80 wt. % (active) oxidizer. Mixtures of water treatment chemical also may be employed.

The initial, predetermined amount of water treatment chemical is followed by one or more maintenance doses of the water treatment chemical. The maintenance doses are added in amounts sufficient to maintain a desired amount of the water treatment chemical in the water over a desired time period such as 24 hours. The maintenance dose may be the same or different from the initial amount of water treatment chemical added to the water. Preferably, maintenance doses of individual water treatment chemical are added to the volume of water. Mixtures of water treatment chemicals also may be added as a maintenance dose.

The maintenance dose of water treatment chemical added to the volume of water undergoing treatment is calculated according to equation (1):

$$MD=(PV)(DC) \quad (1)$$

where $MD$=maintenance dose of water treatment chemical (oz.) added to compensate for loss of water treatment chemical over a given time period $PV$=Volume of water to treated (gallons)

$DC$=Consumption amount of water treatment chemical in the volume of water (oz. water treatment chemical/ 1000 gallons water) over the given time period.

DC is determined by measuring the consumption of a particular water treatment chemical in the type of water system being treated over a given time period. The consumption of the water treatment chemical can be determined by using known analytical techniques.

Maintenance doses of water treatment chemicals are added at selected time intervals, such as every 24 hours, to maintain a desired amount of water treatment chemical in the water. Maintenance doses of sanitizer such as BAQUACIL® Sanitizer and Algistat typically range from about 0.1 ppm/day to about 6.0 ppm/day, preferably about 1.0 ppm/day to about 3.0 ppm/day. The maintenance doses may be added based on a single determination of DC and while avoiding the need to re-measure the amount of water treatment chemical in the water.

The initial dose of oxidizer is added to the volume of water in an amount sufficient to oxidize organic material initially present in the volume of water. Maintenance doses of oxidizer then are added to maintain that amount of oxidizer. Maintenance doses of oxidizers such as BAQUACIL® Shock and Oxidizer from Avecia typically range from about 0.5 ppm/day to about 10.0 ppm/day.

The initial dose of algicide is added to the volume of water in an amount sufficient to prevent algal growth or bloom as determined visually. Maintenance doses of algicide are added in amounts sufficient to prevent algal growth or bloom over a period of 24 hours as determined visually.

The method of water treatment may be performed manually, and also may be automated. The method can be programmed into a device such as a pump to deliver a maintenance dose. The method may be automated by use of a supply device such as a tablet dispenser, powder dispenser, erosion feeder, venturi feeder, gas feeder, and pumps, preferably, a programmable pump. The device such as a pump can be programmed to operate at specific times for specific run time intervals to add maintenance doses of water treatment chemicals to the volume of water undergoing treatment.

The run-time during which the pump is operated to deliver a maintenance dose is calculated according to equation (2):

$$RT=((K)(MD)/(PRPM \times PTD)) \qquad (2)$$

where:
RT=run time of pump (sec) to deliver MD
PRPM=Pump speed (RPM)
PTD=pump tube displacement (ml)/pump revolution
K=conversion constant (1776 ((sec-ml)/(min-oz)).
MD is defined as in equation (1)

To illustrate, assume a pool volume (PV) of 10,000 gal, and that (DC) of the water treatment chemical in the pool is 0.125 oz/1000gal/day. Substituting into Eq. (1), MD is calculated as 1.25 oz. Substituting into Eq. (2), where PRPM=20 and PTD=2, the RT of the pump is calculated as 55.5 sec.

A programmable pump useful in the water treatment method is the BAQUACIL AD™ Automated Dosing System from Avecia Inc. The BAQUACIL AD™ Automated Dosing System includes a dispensing unit that employs two pumps. The pumps are controlled by computer chip programmed according Equations (1) and (2).

A programable pump also may be used to add an initial dose of a water treatment chemical such sanitizer, oxidizer and algicide to freshly-filled (or newly converted) water systems, as well as to administer top-up doses of sanitizer, algicide and oxidizer to established volumes of water to achieve a desired chemistry.

To illustrate the benefits of the invention, a set of 16 recreational test pools and a set of four recreational control pools are treated to compare the effect of maintenance doses of water treatment chemicals on control of water clarity and algae versus conventional weekly—monthly manual dosing of the same chemicals. The treatments also are done to evaluate automated additions of maintenance doses to confirm that the residual amount of water treatment chemical such as sanitizer can be maintained above 30 ppm.

Automated additions of maintenance doses to the 16 test pools are made by using a programmable pump such as that in the BAQUACIL AD™ Automated Dosing System from Avecia. The four control pools are manually treated with maintenance doses. Each test pool is treated with a predetermined, initial dose of sanitizer, oxidizer and algicide by using the BAQUACIL AD™ Automated Dosing System.

An initial dose of the sanitizer BAQUACIL AD™ Sanitizer and Algistat (20% PHMB, polyiminoimidocarbonyliminoimidocarbonyl hexamethylene hydrochloride, US EPA Reg. No. 72674-19) from Avecia Inc. is added as above in the amount of 64 oz/10,000 gallons to achieve 50 ppm of the sanitizer in each test pool. Similarly, an initial dose of the oxidizer BAQUACIL AD™ Shock and Oxidizer (27.5% hydrogen peroxide) from Avecia Inc., is added as above in the amount of at 128 oz/10,000 gallons to achieve 100 ppm of the oxidizer in each test pool. An initial dose of the algicide BAQUACIL AD™ Algicide 10 (9.96% n-alkyl ($C_{14}$, 60%; $C_{16}$, 30%; $C_{12}$, 5%; $C_{18}$, 5%) dimethyl benzyl ammonium chloride, dialkyl ($C_{14}$, 60%; $C_{16}$, 30%; $C_{12}$, 5%; $C_{18}$, 5%) methyl benzyl ammonium chloride in water, US EPA Reg. No. 6836-247-72674) from Avecia Inc. is added as above in the amount of 32 oz (10% active)/10,000 gallons to achieve 2.4 ppm of the algicide in each test pool.

After having added the initial doses, each of the test pools is treated at 24-hour intervals with maintenance doses of the sanitizer, oxidizer, and algicide by using a programmable pump according to equation (2). A programmable pump is included in the BAQUACIL AD™ Automated System. Each test pool receives a maintenance dose of 1.25 oz of BAQUACIL AD™ Sanitizer and Algistat oxidizer per 10,000 gallons pool water, 4.6 oz of BAQUACIL AD™ Shock and Oxidizer per 10,000 gallons pool water, and 1.14 oz of algicide BAQUACIL AD™ Algicide 10 per 10,000 gallons pool water. The maintenance dose of sanitizer is in the form of a 20 wt. % aqueous solution, the maintenance dose of oxidizer is in the form of a 27.5 wt. % aqueous solution, and the maintenance dose of algicide is in the form of a 10 wt. % aqueous solution.

Each control pool is treated with an initial, predetermined dose of sanitizer, oxidizer and algicide water treatment chemicals. These initial doses are measured and manually added by pouring the chemicals around the perimeter of the pool. The initial dose of the sanitizer BAQUACIL® Sanitizer and Algistat (20% PHMB, polyiminoimidocarbonyliminoimidocarbonyl hexamethylene hydrochloride, EPA Reg. No. 72674-19) from Avecia Inc. is added manually to each of the control pools to achieve 50 ppm of sanitizer in each pool. Similarly the initial dose of the oxidizer BAQUACIL® Shock and Oxidizer (27.5% hydrogen peroxide) from Avecia Inc. is added to achieve 100 ppm of oxidizer in each control pool. The initial dose of the algicide BAQUACIL® Algicide (49.8% n-alkyl ($C_{14}$, 60%; $C_{16}$, 30%; $C_{12}$, 5%; $C_{18}$, 5%) dimethyl benzyl ammonium chloride, 0.2% dialkyl ($C_{14}$, 60%; $C_{16}$, 30%; $C_{12}$, 5%; $C_{18}$, 5%) methyl benzyl ammonium chloride in water EPA Reg. No. 72674-20) from Avecia Inc. is added to achieve 2.0 ppm of algicide in each control pool.

Maintenance doses of BAQUACIL® sanitizer are added manually every 10–14 days to the control pools. Maintenance doses of BAQUACIL® sanitizer are added when the measured BAQUACIL level falls to or below 30 ppm. The BAQUACIL® sanitizer is added in an amount to achieve 50 ppm of the sanitizer in the pool volume. Maintenance doses of oxidizer are manually added in the amount of 128 oz oxidizer per 10,000 gallons pool volume once per month. Maintenance doses of algicide are manually added in the amount of 1.25 oz algicide per 10,000 gallons pool volume once per week.

All pools are examined a minimum of three times per month. Water samples are collected from each pool and tested for residual amounts of sanitizer and oxidizer. Water balance parameters, water temperature and turbidity, also are evaluated. The ppm levels of the oxidizer and the sanitizer in the pool water are measured by using the PINPOINT™ Water Analysis System Portable Lab from Avecia Inc. Turbidity is measured using a Hach Corp. 2100P Turbidimeter. Algae and water clarity are evaluated visually. The rating scales used for evaluation of algae and water clarity are shown in Tables 1 and 2.

Evaluation of Residual Sanitizer Amount

Residual Sanitizer amounts are measured a minimum of three times per month. Average residual sanitizer amounts are calculated for the test pools and for the control pools. The average residual sanitizer amounts for the test pools is 36.6±6.0 ppm compared to an average of 36.0±4.0 ppm for the control pools. This shows that maintenance doses as calculated by the method of the invention as in Equations (1) and (2), and which can be added in an automated manner, maintain amounts of sanitizer in the test pools equivalent to levels achieved by following weekly manual dosing to maintain a level of the sanitizer in an amount of more than 30 ppm.

Evaluation of Algae Concentration

Visual assessment of the amount of algae present in a pool is conducted a minimum of three times per month and assigned a rating between 0 and 4. The rating scale used is shown in Table 1.

TABLE 1

Rating Scale for Visual Assessment of Algae

| Rating | Algae description |
|---|---|
| 0 | No trace of visible algae anywhere in the pool |
| 1 | Trace amounts present on pool sides or bottom |
| 2 | Small patches easily observed on pool sides and bottom |
| 3 | Large patches easily observed on pool sides and bottom |
| 4 | 25% or more of pool sides and bottom covered by algae |

An acceptable algae rating is 1 or less. The algae rating reflects the amount of algae present. A rating of "0" means there are no visible signs of algae, whereas a rating of "4" means the pool is infested with algae covering >25% of the visible pool surfaces or that the water column is a solid green color due to planktonic algae. The percent of pools that have acceptable algae ratings are listed in Table A.

TABLE A

Algae Ratings Percentages

| System | Percentage of Ratings where the ratings ≦ 1 | Percentage of Ratings where the ratings > 1 |
|---|---|---|
| Test pools dosed with the BAQUACIL AD ™ auto dosing system | 89.0 | 11.0 |
| Control pools | 75.0 | 25.0 |

As shown in Table A, the method of the invention provides superior control of all three types of algae, including the target Chlorella spp. (green algae) common to swimming pools.

Evaluation of Clarity and Turbidity Testing

A visual assessment of water clarity is conducted a minimum of three times per month and assigned a water clarity rating between 0–4. The clarity rating reflects the turbidity of the water. A rating of "0" means the water is crystal clear, whereas a rating of "4" means the pool is so cloudy that no real depth could be perceived. The rating scale used to visually assess water clarity is listed in Table 2.

TABLE 2

Rating Scale for Visual Assessment of Water Clarity

| Rating | Water Clarity Description |
|---|---|
| 0 | Sparkling clear water |
| 1 | Water appears dull, slight haze present |
| 2 | Main drain is visible but not distinct |
| 3 | Bottom of shallow end of visible, main drain is not |
| 4 | Cannot see bottom in the shallow end |

An acceptable clarity rating is 1 or less. The percent of pools that have acceptable clarity rating readings are listed in Table B.

TABLE B

Percent Acceptable and Unacceptable Clarity Ratings

| System | Acceptable Ratings ≦ 1 (%) | Unacceptable Ratings > 1 (%) |
|---|---|---|
| Test pools dosed with the BAQUACIL AD ™ auto dosing system | 95.5 | 4.5 |
| Control (Manually dosed) | 75.0 | 25.0 |

Test pools that are treated with maintenance doses according to the method of the invention have a much lower incidence of hazy water than the control pools which are those dosed manually.

The average turbidity value for the test pools is 0.7 NTU (Nephelometric Turbidity Units). This average turbidity value corresponds to a haze rating of 0 and is excellent. In comparison, the average turbidity value for the control pools that are not treated daily is much higher at 1.1 NTU. The lower average turbidity for the test pools correlates well with the visual assessment.

The invention claimed is:

1. A method of treating a volume of water to maintain a predetermined amount of a water treatment chemical in the volume of water over a time period comprising, determining an amount of a water treatment chemical to be preserved in a volume of water to be treated, calculating a maintenance dose of the chemical to be added to the volume of water to maintain about the amount of the chemical in the water over the time period, providing a source of the chemical, and supplying the maintenance dose of the water treatment chemical to the volume of water, wherein the maintenance dose is calculated according to equation (1):

$$MD = (PV)(DC) \quad (1)$$

where

MD = Maintenance dose of water treatment chemical (oz.);
PV = Volume of water to be treated (gallons); and
DC = Consumption of water treatment chemical over the time period (oz. per 1000 gallons);

and wherein the supplying of the maintenance dose is performed by a pump having a pump tube displacement and which is caused to operate for a run time determined according to equation (2)

$$RT = ((K)(MD)/(PRPM \times PTD)) \quad (2)$$

where:
RT=Run time of pump (sec)
PRPM=Pump speed (RPM)
PTD=Pump tube displacement (ml/pump revolution
K=1776 ((sec-ml)/(min-oz)), and
MD is defined as in equation (1).

2. The method of claim 1 wherein the source of the chemical is an aqueous solution of the chemical.

3. The method of claim 2 wherein the solution has about 0.5 wt. % (active) to about 80 wt. % (active) water treatment chemical.

4. The method of claim 1 wherein the pump is caused to operate by a computer programmed according to equation (2).

5. The method of claim 1 wherein the chemical is selected from the group consisting of algicides, sanitizers, oxidizers, chelating agents, pH control agents, corrosion inhibitors and stabilizers.

6. The method of claim 1 wherein the chemical is selected from the group consisting of chlorine dioxide, lithium hypochlorite, sodium hypochlorite, (poly(hexamethylene biguanide) hydrochloride), 1,3-bromo-cliorodimethylhydantoin, and 1,3-dibrormodimethylhydantoin, hydrogen peroxide, potassium monopersulfate, sodium perborate, sodium percarbonate, copper sulphate, copper citrate, copper EDTA (ethylene diaminetetraacetic acid), copper gluconate, colloidal silver, silver nitrate, poly (oxyethylene (dimethylimino) ethylene (dimethylimino) ethylene dichloride), sodium dimethyldithiocarbamate, 2-chloro4, 6-bis (ethylamino)-5-triazine, zinc chloride, zinc oxide, and benzyl alkonium chloride.

7. The method of claim 1 wherein the chemical is selected from the group consisting of alkali metal hypochlorite, alkaline earth metal hypochlorite, chlorinated isocyanurates, halogenated hydantoins, alkali metal perborates, alkali metal percarbonates, copper salts, silver salts, quaternary ammonium compounds, polyquaternary amrnonium compounds, zinc salts, chelating agents, fungicides, pH control agents, corrosion inhibitors, and stabilizers.

8. The method of claim 1 wherein the water treatment chemical is hydrogen peroxide.

9. The method of claim 3 wherein the water treatment chemical is sanitizer added in a maintenance dose of about 0.1 ppm/day to about 6 ppm/day.

10. The method of claim 3 wherein the water treatment chemical is sanitizer added in a maintenance dose of a bout 1 ppm/day to about 3 ppm/day.

* * * * *

UNITED STATES PATENT AND TRADEMARK OFFICE
CERTIFICATE OF CORRECTION

PATENT NO. : 7,094,353 B2
APPLICATION NO. : 10/691479
DATED : August 22, 2006
INVENTOR(S) : Michael J. Unhoch It is certified that error appears in the above-identified patent and that said Letters Patent is hereby corrected as shown below:

In claim 1, column 8, at lines 56 and 67, equation designators "(1)" and "(2)" appear to be merged with the equations.

The equation at line 56 should be corrected to read:
"MD=(PV)(DC)          (1)"

The equation at line 67 should be corrected to read:
"RT=((K)(MD)/(PRPM$_X$PTD))          (2)"

In claim 1, column 9, at line 4, a close parenthesis following "(ml" is omitted from the equation and should be corrected to read: "(ml/pump revolution"

In claim 10, column 10, line 21, the word "a bout" is incorrect, and should be corrected to
read: "about".

Signed and Sealed this

Nineteenth Day of December, 2006

JON W. DUDAS
*Director of the United States Patent and Trademark Office*